United States Patent [19]

Hellmund et al.

[11] 4,153,283
[45] May 8, 1979

[54] CASING JOINT

[75] Inventors: Wolfgang Hellmund, Viersen; Gerhard Krug, Düsseldorf; Gerhard Missaire, Düsseldorf; Kurt Roether, Düsseldorf; Paul Schatton, Düsseldorf, all of Fed. Rep. of Germany

[73] Assignee: Mannesmann Aktiengesellschaft, Düsseldorf, Fed. Rep. of Germany

[21] Appl. No.: 832,619

[22] Filed: Sep. 12, 1977

[30] Foreign Application Priority Data

Sep. 14, 1976 [DE] Fed. Rep. of Germany ....... 2641767

[51] Int. Cl.² ............................................. F16L 21/00
[52] U.S. Cl. .................................................... 285/334
[58] Field of Search ............................... 285/334, 333

[56] References Cited

U.S. PATENT DOCUMENTS

| 1,932,427 | 10/1933 | Stone | 285/334 |
| 2,239,942 | 4/1941 | Stone et al. | 285/334 X |
| 2,532,632 | 12/1950 | MacArthur | 285/333 X |
| 3,359,013 | 12/1967 | Knox et al. | 285/334 X |
| 3,572,777 | 3/1971 | Blose et al. | 285/334 |

FOREIGN PATENT DOCUMENTS 2438387 2/1976 Fed. Rep. of Germany ........... 285/333

Primary Examiner—Thomas F. Callaghan
Attorney, Agent, or Firm—Smyth, Pavitt, Siegemund, Jones & Martella

[57] ABSTRACT

A box member and a pin member each have a tapered thread, an abutment end face and a shoulder for engagement respectively with shoulder and end face of the other member, one coacting surface pair being conical, the other one being planar. Shoulder and end face are spaced differently in the two members such that upon engagement of a conical shoulder and end face, planar end face and shoulder have a gap of about 0.5 to 2.5 per cent of the spacing. Taper/bulge seals are provided adjacent the abutment surfaces to be effective before the planar surfaces abut as the joint is made up. The effective pitch diameter of the pin member remains consistently smaller than the pitch diameter of the box member, at least up to an insertion of the pin member so that the planar surfaces abut.

3 Claims, 5 Drawing Figures

CASING JOINT

BACKGROUND OF THE INVENTION

The present invention relates to casing joints particularly of the kind in which a box member and a pin member are respectively provided with complementary conical or tapered threads and wherein each of such members has one conical and one planar abutment surfaces for mutual engagement of the respective other complementary such abutment surface.

In joints of such type, one or both abutment surfaces of one of the element as engaging the respective other, facing, complementary abutment surface of the other element provides for sealing of the joint. Interengagement of both surfaces may seal the ends of both members of the joint, which is quite desirable in case a problem exists in that differently dimensioned box and pin members establish unforseeably different seals in that manner. Generally, that aspect has been recognized. It has not been recognized, however, that different degrees of yielding of the box and pin member end portions modify the seals further and in quite an unforseeable manner as far as the interengagement of abutment surfaces is concerned.

It has been suggested to provide one of the members with an annular groove to establish a definite higher degree of yielding of that member's end. If that groove is disposed at that end of the thread adjacent to which there is a plane abutment surface, one reduces therewith the impediment that surface provides against further threading.

Generally speaking, one can say that the state of the art has lead towards a development, tending to equalize the sealing effect of dual (axially spaced) abutment surfaces of the two members as interengaging.

It has been neglected, however, to prevent too deep a penetration of a pin member into the box member, casing widening of the latter and cracking on account of tangential tension. Even if the box member did not crack on making up of the joint, tension crack corrosion was often the result. Also, wherever sealing depended on a bulge behind one of the abutment ends, the bulge was often squeezed to such an extent that the respective member could not be reused. Generally speaking, the prior art neglected to provide a proper balance between minimum conditions of threading effecting and completing a seal, and undue application of threading force that would damage the joint.

The following patents are representative examples of the state of the art in which such box and pin members each have a shoulder and an end face, whereby the end face of one is to sealingly engage the shoulder of the other, and/or wherein tapered faces adjacent to such shoulders and end faces provide such seals: U.S. Pat. Nos. 3,359,013; 2,111,196; 2,239,942; 2,258,066; 2,772,899.

None of these references suggests or discloses the present invention.

DESCRIPTION OF THE INVENTION

It is an object of the present invention to deviate from the development tendencies of the prior art and to provide a casing joint which is secured against excessive application of threading force, ensuring however, that the surface pressure as between interengaging conical sealing surfaces (one of them being an end face) reaches a prescribed minimum regardless whether the joint is made up for the first time or several times with different combinations box and pin members thereafter.

It is a specific object of the present invention to improve a casing joint made up from a box member and a pin member having complementary tapered threads and wherein each member has an axial end face and a shoulder at the other end of the respective thread, whereby one end face and shoulder combination is conical, and the other shoulder-end face combination is planar.

In accordance with the preferred embodiment of the present invention, the improvement of the casing joint as per the specific object meeting the general object is comprised of the rule according to which the axial spacing of shoulder and end face of the member whose end face is conical is slightly larger, preferably by about 0.5 to 2.5 per cent larger than the axial spacing of the conical shoulder and planar end face of the respective other member. Furthermore, the pitch diameter of the box thread is equal to or larger than the pitch diameter of pin member for a fully made up joint.

In addition, it is suggested to provide the interengaging portions of the planar surfaces and the interengaging portions of the conical surfaces so that the radial width of the former is larger than the radial width of the latter.

The teaching of the invention provides a casing joint in which positively the conical abutment surfaces engage first. The conical abutment establishes inherently a radial yielding which, possibly in conjunction with a taper-bulge seal adjacent thereto, establishes a reliable (double) seal, as soon as a minimum threading force is exceeded. That seal is established and, to a minimum degree, completed prior to interengagement of the planar abutment surfaces. Should for any reason a larger, even a much larger threading force be applied (variations here can be quite large and depend to a considerable extent on the action of the human operators). This once established seal is not endangered because upon engagement of the planer engagement and abutment surfaces one obtains a definite step in the relation between any continuation of threading and the application of the requisite force to obtain that continuation. The people working on the making up of the joint pay little intention to the axial displacement of the members to each other, but rely almost exclusively on torque and moment, i.e. on the reaction to their threading effort. Once the planar surfaces abut large moments and forces as applied produce little further axial displacement between the box and the pin members. That aspect is the direct result of the invention. In particular, the drastic increase in requisite moment for continuing threading following the planar surface abutment prevents undue penetration of the pin member into the box member. Also, as threading still continues after the planar surfaces abut, the latter abutment results in little radial yielding of the particular portions of the members having these abutment surfaces and that in turn prevents undue crushing of the conical surfaces and adjacent seals, and that in turn is instrumental in the reusability particularly of the member having a conical end face.

As stated, the invention avoids also that the conical threads too deeply penetrate each other axially so that the box member is not widened nor tangentially tension biased by the pin member. Such tangential tension is particularly responsible for fractures in prior art box members. These fractures would occur either directly during making up the joint, or subsequently as stress corrosion cracking particularly in acidic oil fields.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings FIG. 1 shows a pin member 1 and a box member 2 in representation of two tubes or pipes to be interconnected. A joint has been made up by threading the conical, tapered thread 3 of the pin member into the conical and tapered thread 4 of the box member.

Figure 1:
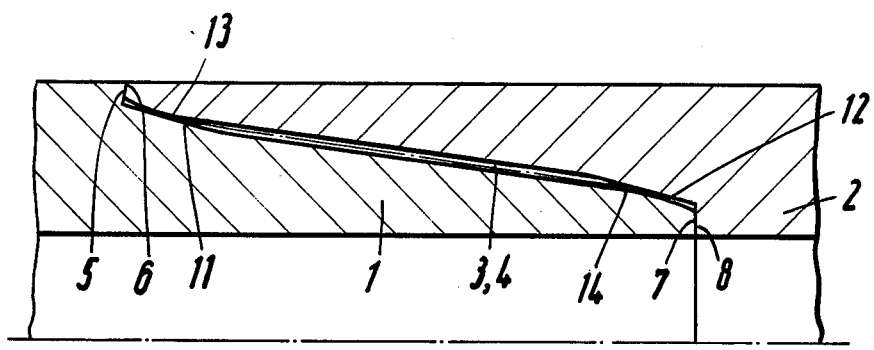
FIG. 1 is a cross-section through a made up casing joint in which a conical abutment face is situated at the outside.

The pin member 1 has a conical shoulder 5 serving as abutment surface against which abuts a matching, conical end face 6 of box member 2. The taper of surfaces 5 and 6 is considerably shallower than the taper of the threads 3 and 4. As to the inside of the tubing or casing, a plane end face 7 of pin member 1 abuts against a plane shoulder and abutment surface 8 of box member 2.

Figure 2:
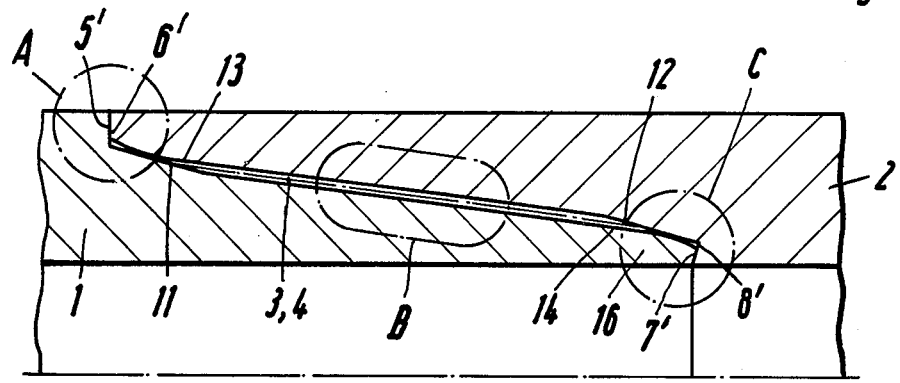
FIG. 2 is a cross-section through a made up casing joint in which a conical abutment face is situated at the inside.

The construction is analogous in the example shown in FIG. 2 except that 7' and 8' denote conical abutment faces on the inside of the casing or tubing, and 5' and 6' denote plane abutment surfaces on the outside. It was found practical to provide the conical abutment faces on the inside, as per FIG. 2, if the casing is to be expected to be subjected to high internal pressure. The conical abutment faces should be provided on the outside as per FIG. 1 if the casing is to be sealed against outside pressure.

In both of these examples sealing is not exclusively effected by the abutment surfaces 5, 5', etc. Rather, conical tapers (11, 12) cooperate with bulging surfaces (13, 14) as primary sealing elements, being arranged between the abutment surfaces and the thread in each instance. The particular taper-bulge seal adjacent the conical end faces (11, 13 in FIG. 1; 12, 14 in FIG. 2) are actually reinforced by the conical faces (5, 6 in FIG. 1; 7', 8' in FIG. 2), because the cones have an orientation tending to radially force the bulge towards the taper.

Figure 3A:
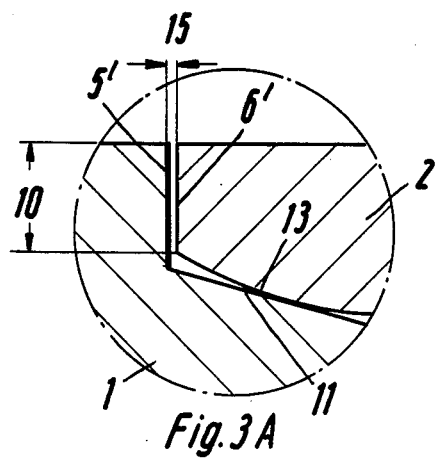
FIGS. 3A, B, and C are respectively enlargements of the fields A, B, and C as so identified in FIG. 2, but under conditions in which the joint is not yet completely made up.

Proceeding now to the details shown in FIGS. 3A, B, and C, we turn first to FIG. 3A showing the shoulder face 5' of pin member 1 and end face 6' of box member 2. Reference numeral 10 refers to the width of the annular area of possible (and, later, actual) contact between these surfaces 5', 6'. In addition, reference numeral 11 refers to the conical or tapered surface, the taper corresponding to a cone having a much smaller apex angle than any of the cones such as 5, 6 or 7', 8. This tapered surface 11 extends between shoulders 5' and the thread 3 of the pin member 1.

Opposing tapered surface 11, when the joint is partially or completely made up, is situated the bulging surface 13 which extends between the end face 6' and the thread 4 of box member 2. The bulge 13 can be understood to be an annular bulge extending radially inwardly from a generally conically configured portion of the bore in box member 2.

Figure 3C:
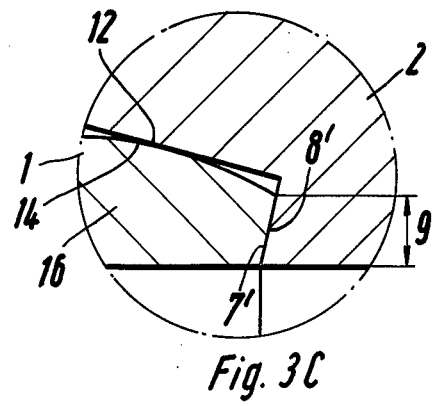

It is a significant feature of the present invention, that the two planar faces 5', 6' are spaced from each other by a distance 15 in the instant faces 7', 8' abut upon making up the joint (FIG. 3C). That distance is about 0.5 to 2.5 per cent of the axial length between 5' and 7' (or 6' and 8'). The situation is quite analogous for FIG. 1. When faces 5, 6 just abut, faces 7 and 8 are still spaced by such a distance or spacing.

It should be noted, that the bulging surface 13 and the taper 11 are also present in FIG. 1. The abutment surfaces 5, 6 differing from 5', 6' only in that the latter are conical, the former are planar, i.e. extend at right angles to the casing axis.

FIG. 3C shows the end face 7' of pin member 1 in direct abutment with shoulder 8' of box member 2. Reference numeral 9 refers to the radial dimension of the actual annular area of contact of the two conical surfaces 7', 8'. It is a feature of the invention, that the radial width of annulus of contact of the planar faces (i.e. 10 of 5', 6') is larger than the radial width of the frusto-cone of contact of the conical faces (i.e. 9 of 7', 8'). The purpose thereof will be apparent below.

The gradual taper 12 pertaining to a relatively steep cone extends between shoulder 8' and thread 4 of box member 2; the bulging surface 14 extends between end face 7' of pin member 1 and the thread 3 thereof.

The extremity of the bulge 14 does or just about does engage taper 12 when faces 7', 8' abut. It can readily be seen, that any axial displacement of members 1, 2 towards each other results in a radial inward yielding of the pin member end 16 thereby positively effecting sealing engagement between 14 and 12. This aspect is known per se, but it is significant that this sealing action occurs and is reinforced in the stated manner before the planar faces 5', 6' abut!

As the joint is made up, pin member 1 is threaded into box member 2 and soon the end face 7' abuts shoulder 8'. When that occurs, the bulging surfaces 13, 14 may also engage the respective tapes 11, 12. However, face 6' is still spaced from shoulder 5' at that point by the distance 15. As the threading continues the force transfer via the interengaging threads causes an axial tension to be exerted upon the box member 2 resulting in an elastic axial tensioning and extension thereof. Also, the interengaging surfaces 7' and 8' provide for a surface pressure such that the threadless pin portion 16 is subjected to radially outwardly extending spreading; the cones 7' and 8' are oriented accordingly. Consequently, bulge 14 positively sealingly engages taper 12 and further threading reinforces that seal. Therefore, sealing is positively established before faces 5', 6' abut, and the seal 12, 14 is supplemented by any sealing of faces 7', 8'.

The last mentioned continued threading reduces the distance 15 and shortly faces 5' and 6' engage, while bulge 13 is sealingly forced towards taper 11. As surfaces 5' and 6' abut, a triple seal is already provided. A first one is the engagement of conical faces 7' 8'; a second (but primary) one results from the engagement of bulge 14 and taper 12; and a third seal is now provided by the engagement of bulge 13 and taper 11. This situation is positively present upon applying a minimum threading moment-torque, which arises upon abutment of the planar surfaces 5', 6'.

Upon still further continued threading the planar faces 5', 6' interengage forcibly and are forced against each other. This in effect limits the axial tension in box member 2. In particular, shoulder 5' now superimposes an axial compression force upon box member 2, so that the tension force exerted by the pin member end upon the box member is in fact relieved in parts. Thus, after the minimum threading moment has been reached, tension stress on the box member is limited thereafter. The gap 15 is instrumental in proportioning this limiting effect. Also, further penetration of pin member 1 into box member 2 is reduced and impeded as faces 5', 6' abut. This is particularly important, because too deep a penetration of the pin member into the box member would result in the production of a tangential tension force, setting up tangential stress in box member 2. It is that force which in the past either fractured the box member or produced stress corrosion.

Figure 3B:
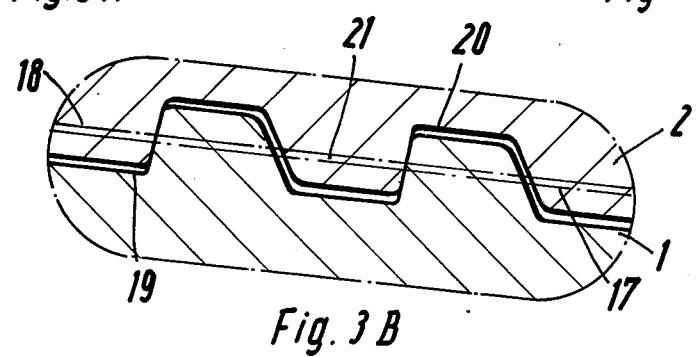

The particular thread should now be considered as per another feature of the invention and as shown in FIG. 3B. As the joint is made up, the two conical threads 3, 4 have effective pitch diameters such that the diameter 17 of pin thread 3 (thread ways 19) is smaller than the pitch diameter 18 of box thread 4 (thread ways 20). That situation is also to be present when the faces 7', 8' abut and should remain so at least until the minimum torque (abutment of faces 5', 6') has been reached. This way pin member 1 as a whole does not act radially on box member 2 (excepting of course the seal area 14, 12). Accordingly, circumferential tension is not set up in the box member and the latter is protected as mentioned.

After engagement of planar surfaces 5' and 6' the pressure force exerted by the surfaces 7' and 8' upon each other does not increase any longer at the previous rate of increase of the threading moment. Thus, there is a definite step in threading force and moment for continuing the threading after the faces 5', 6' abut.

A danger point is reached when the threading moment has risen to a sizable multiple of the minimum moment and force. However reaching that danger point does not (at least at first) impede the state of operation and operability of the joint, because tension and compression loads are distributed in both members. Unfavorable tension-stress or even fracture will not occur. In other words the increase in threading moment following abutment of planar forces 5', 6' has a wide margin of safety before any serious problem can arise. Therefore, the particular joint operates with a multiple metallic seal which in total is well protected against the consequences of a rather high, evan an unduly high, threading moment and force. This applies particularly to the more sensitive box element 2.

It should be mentioned however, that as a rule and upon making up the joint, the minimum moment should positively be exceeded but that instance is readily detectible even by the most careless crew.

It can readily be seen, that making up the joint as per FIG. 1 is analogous to that as per FIG. 2. The conical surfaces 5, 6 engage first, resulting in axial tension in the pin member 1 until the planar surfaces 7, 8 engage.

As stated, the radial width (10) of the planar contacting surfaces should exceed the radial width (9) of the conical contacting surfaces. This way one obtains an optimum relief of the tensioned member under utilization of a surface pressure which is small as compared with the yield point of the pipe material. The aforementioned security against cracking upon application of unduly high threading force is analogously effective here.

The invention is not limited to the embodiments described above but all changes and modifications thereof not constituting departures from the spirit and scope of the invention are intended to be included.

We claim:

1. In a casing joint to be made up from a box member and a pin member, having complementary, tapered threads and wherein each member has an axial end face and a shoulder, the thread being between the end face and the shoulder, and wherein the end face of one member is conical, the shoulder of that one member being planar, the end face of the other member being planar and the shoulder of the other member being conical, and wherein the box and pin members have sealingly engaging surface portions located between the engaging threads and the conical shoulder and face, being in abutment when the joint is made up, the improvement comprising:

the one member having the conical end face spaced axially from its planar shoulder at a spacing larger than a spacing between the conical shoulder and the planar shoulder of the other member; and the pitch diameter of the thread of the box member being larger than the pitch diameter of the thread of the pin member everywhere along the threads and upon abutment of the conical shoulder and face, the conical shoulder and face being oriented to cause the member having the conical end face to be forced radially towards the other member upon further threading.

2. In a casing joint as in claim 1, wherein said spacings differing by about 0.5 to 2.5 per cent.

3. In a casing joint as in claim 1, wherein an annular width of the interengaging planar face and shoulder is larger than the annular width of the conical face and shoulder as interengaging.

* * * * *